United States Patent [19]

Tienken

[11] Patent Number: 5,025,350

[45] Date of Patent: Jun. 18, 1991

[54] VEHICLE CLEARANCE LAMP ASSEMBLY

[75] Inventor: Alfred G. Tienken, Syracuse, N.Y.

[73] Assignee: Federal-Mogul Corporation, Southfield, Mich.

[21] Appl. No.: 514,480

[22] Filed: Apr. 25, 1990

[51] Int. Cl.$^5$ ............................................... H01R 4/24
[52] U.S. Cl. ..................................... 362/61; 362/238; 439/395; 439/407
[58] Field of Search ........................... 362/61, 236–238; 439/395, 396, 406, 407, 417, 418

[56] References Cited

U.S. PATENT DOCUMENTS

| | | | |
|---|---|---|---|
| 4,346,955 | 8/1982 | Chesnais et al. | 439/407 |
| 4,648,673 | 3/1987 | Endo et al. | 439/395 |
| 4,648,674 | 3/1987 | Sanchez | 439/395 |
| 4,707,767 | 11/1987 | Bergin et al. | 362/61 |
| 4,734,054 | 3/1988 | Steffinger | 439/407 |
| 4,840,578 | 6/1989 | Sato | 439/395 |

Primary Examiner—Carroll B. Dority
Attorney, Agent, or Firm—Lawrence J. Shurupoff

[57] ABSTRACT

A lamp assembly having a plurality of individual bulb sub-assemblies together with lens covers is provided in which bulb sub-assemblies can be simply and easily snapped together and then encapsulated in a molded base member than can be readily inserted and removed from the overall lamp housing. A lamp assembly with several bulb sub-assemblies can be quickly and easily installed on a vehicle with a single electrical connection. The individual lens covers and bulbs can be easily serviced. The bulb sub-assemblies are constructed from a simple connector plate and housing which are assembled in multiple units along a pair of conductors to form the desired electrical and mechanical mounting for the individual bulbs and proper mating with the lamp assembly housing.

14 Claims, 2 Drawing Sheets

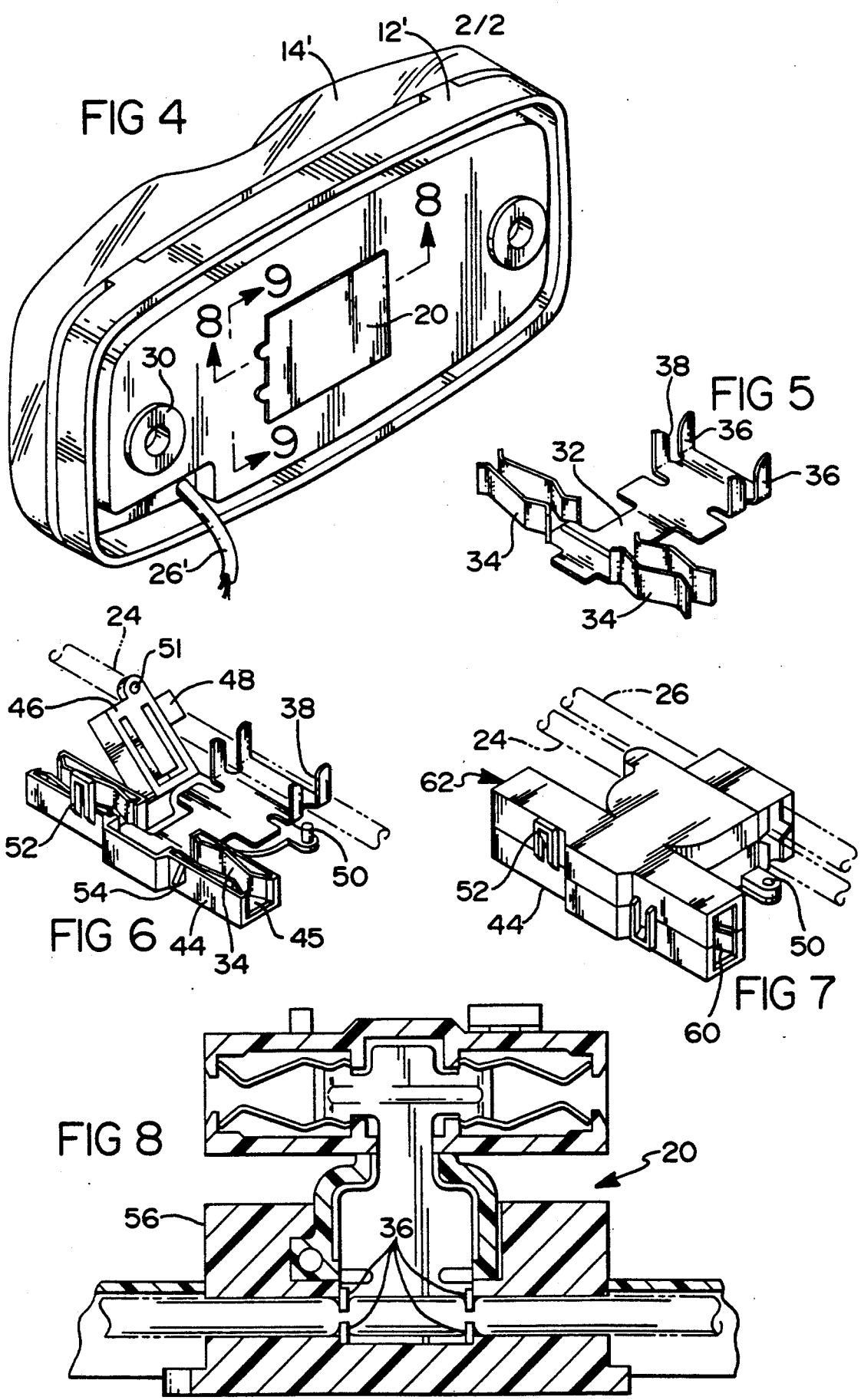

VEHICLE CLEARANCE LAMP ASSEMBLY

BACKGROUND OF THE INVENTION

This invention relates to automotive type lamp assemblies and more particularly to clearance type lamps for vehicles where traditionally several lamps are mounted in a row.

It is highly desirous in the vehicle industry to have a clearance light assembly that can be quickly and easily installed on a vehicle, quickly and easily serviced should a bulb burn out, and quickly and easily replaced if damaged. While it has been common practice for many years to mount clearance lights on top of cabs and on the back and sides of truck bodies in multiple sequences, it has also been common practice to mount individual lights in a spaced configuration about the vehicle to achieve the desired clearance marking. This has necessitated not only multiple fixtures but multiple connections and has greatly increased the time and cost of installation and servicing. Also, since clearance lights are frequently damaged by various obstructions encountered by the vehicle, the cost of replacement becomes a major concern both from the cost of the fixture and the labor involved.

OBJECTS AND SUMMARY OF THE INVENTION

It is therefore an object of the present invention to improve clearance lighting units for use in motor vehicles, trailers, and the like. It is an object of the present invention to provide a lamp unit for use in clearance lighting in a vehicle that is cheap and economical to manufacture.

It is another object of the present invention to provide a clearance light for large over the road vehicles that is simply and easily installed.

It is a further object of the present invention to provide a modular clearance light assembly by which multiple lights can be quickly and easily installed with a single electrical connection and physical mounting.

It is a still further object of the present invention to provide a clearance light assembly for large vehicles, which can be quickly and easily mounted on the vehicle, and in which the light bulbs can be quickly and easily replaced if they fail.

It is yet another object of the present invention to provide a modular clearance lamp assembly that has at least two bulbs in each unit and which is shock mounted within the unit to absorb road and hazard shocks and prolong life.

It is yet a further object of the present invention to provide a multiple light clearance lamp assembly which can be mounted on a vehicle with a single electrical connection.

These and other objects of the present invention are attained in a particular embodiment of the present invention by means of a modular lamp assembly having a back member with a plurality of lens covers mounted thereon and a corresponding plurality of bulb assemblies resiliently mounted in openings formed in the back member with an electrical bus connecting the bulb assemblies within the over all lamp assembly so that a single electrical connection will activate all bulbs. Simplified fixture mounting, removal and replacement of lens covers and bulbs is achieved by this modular construction.

BRIEF DESCRIPTION OF THE DRAWINGS

Further objects and advantages of the present invention will be apparent from the following detailed description of the invention which is shown in the accompanying drawings, wherein

FIG. 4 is a perspective back view of a single modular lamp according to the present invention;

FIG. 5 is a perspective view of the electrical connector plate of the bulb assembly of the present invention;

FIG. 6 is a view similar to FIG. 5 of the insulating housing for the connector plate of FIG. 5;

FIG. 7 is a perspective view of a pair of assembled housings showing how they can be assembled about a conductor to form a bulb assembly;

FIG. 8 is a cross sectional view on line 8—8 of FIG. 4 showing the bulb assembly encapsulated in its mounting base.

DETAILED DESCRIPTION OF A PREFERRED EMBODIMENT

Figure 1:
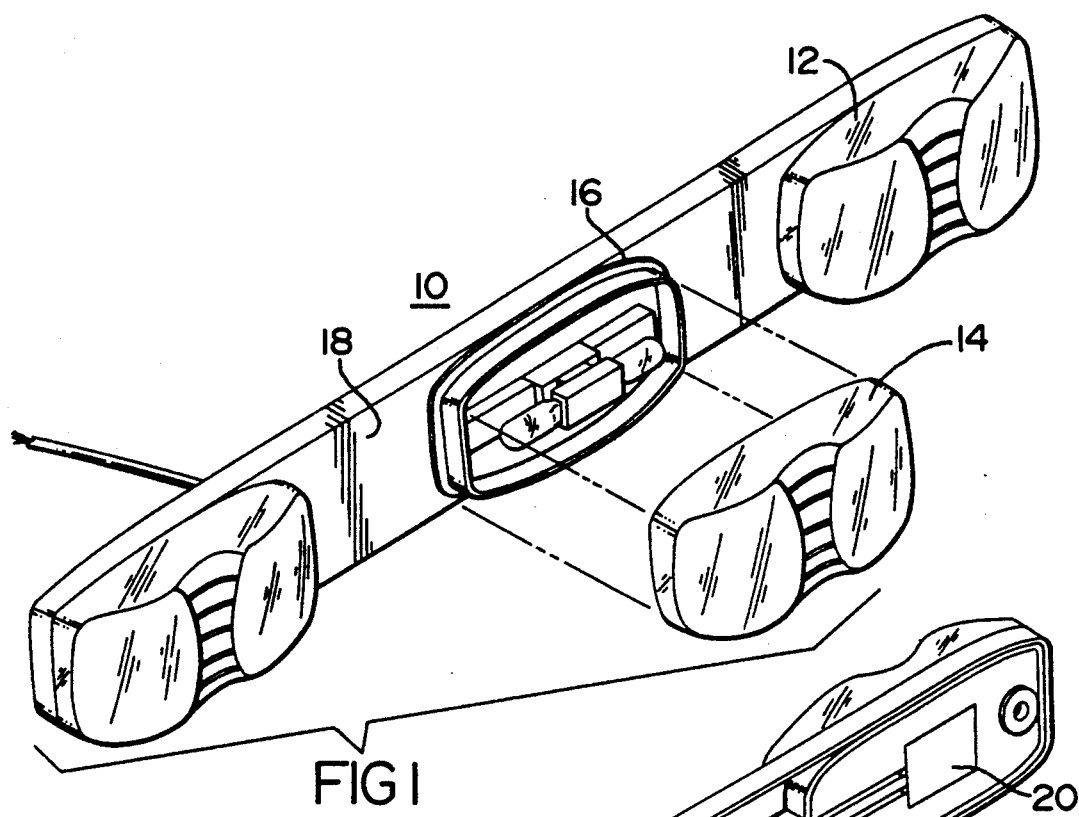
FIG. 1 is a perspective exploded view of the lamp assembly according to the present invention.

Referring now to FIG. 1 there is shown a clearance lamp assembly 10 having three modular bulb and lens cover assemblies 12 which will be described in detail herein. Each assembly 12 includes the back member or portion thereof, a bulb sub-assembly and a lens cover. The individual lens cover 14 can be simply and easily snapped off a base mounting ring 16 on the back plate 18 of the lamp assembly 10. While the lamp assembly 10 is shown herein having 3 individual modular lamp units any desired number can be accommodated with the construction of the present invention.

Figure 2:
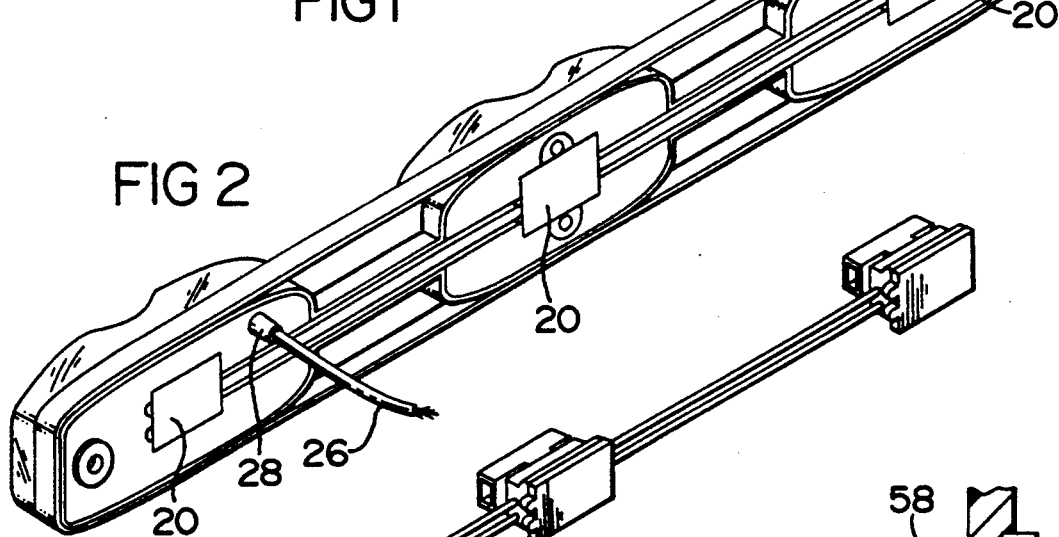
FIG. 2 is a perspective view of the back of the assembly of FIG. 1.
Figure 3:
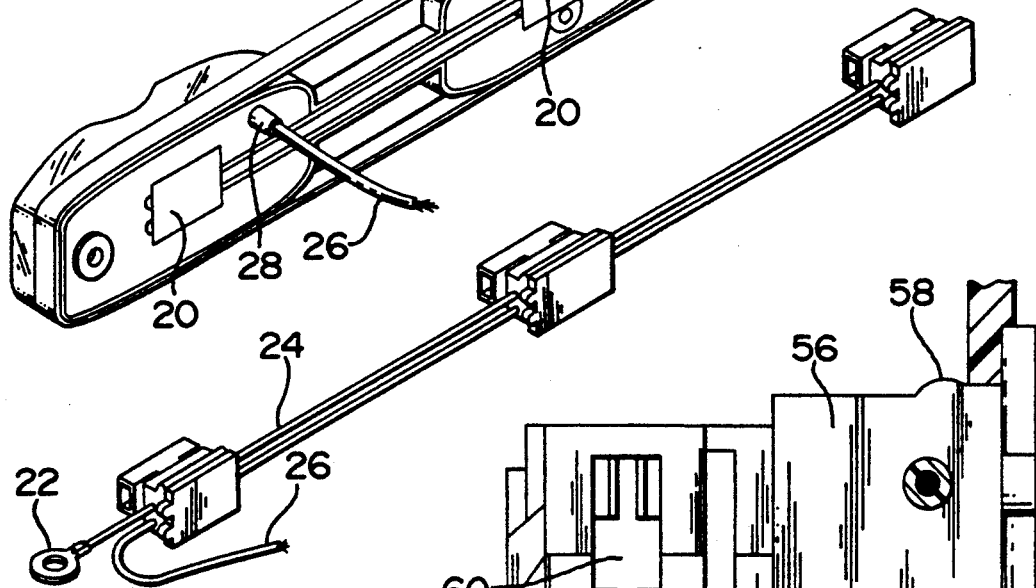
FIG. 3 is a perspective view of the bulb sub-assemblies removed from the back plate of FIGS. 1 and 2.

As seen in FIG. 2 each module 12 has positioned therein on the back side of the base 18 a bulb sub-assembly 20 which is connected as will be described herein to a conductor bus having a ground and hot wire which connect with other like bulb sub-assemblies within the overall unit 10 to an end where the ground conductor is connected through one of the mounting fasteners to the vehicle frame. The power or hot side is taken out through one of the end modules for connection to the vehicle electrical system. This is shown in FIG. 3, where the grounding grommet 22 is shown at the left end crimped to the ground wire 24, and the hot wire 26 is shown being brought out in FIG. 2 through a ferrule 28 for connection to the vehicle electrical system.

Referring now to FIG. 4 there is shown an individual module 12′, which consists essentially of a single element from FIG. 1 including a lens cover 14′ and a bulb module 20, which is identical to the bulb module shown in FIG. 2 except that it is individually connected to the wire 26′ and is inside the housing for connection to the mounting bolt that will go through the hole 30 the ground lug 22′. By this modular construction, a clearance light system can be developed having anywhere from 1 to many individual lamp assemblies, each essentially the same as the other, all ganged together and connected by a single electrical connection to the electrical system of the vehicle.

To take advantage of this modularity it was essential to develop a simple bulb socket or subassembly system to permit rapid construction of one or more bulb subassemblies to fit the desired lamp assembly configuration.

The heart of the bulb subassembly 20 is a conductive connector plate 32 as shown in FIG. 5 which has at one end two pairs of upturned spring fingers 34 that are extended to receive there-between a lamp stem having the electrical contact to the element within the bulb folded back on the surface of the glass stem. At the other end of the plate 32 there are two pairs of upstanding insulation piercing ears 36 bent up at right angles on each side of the plate 32 and spaced apart a distance slightly less than the diameter of the wire to be connected to the bulbs. The inner or adjacent edge 38 of ears 36 are sharpened to cut into wire insulation.

As may be seen in FIG. 6 there is shown in phantom lines an insulated wire conductor 24 inserted into the ears 36. The wire 24 is forced down between the ears 36, which due to the sharp edges 38 cut through the insulation and make good electrical contact with the wire 24 running through the conductor.

To insulate the conductive plate 32 from other parts of the apparatus and to securely support the conductors 24 and 26 between the upstanding ears 36 there is provided a housing 44 of a nonconducting plastic or other material. Housing 44 includes channel 45 at one end and tab 46 at the other. Channel 45 receives the opposed pairs of spring fingers 34. At the other end hinged tab 46 has a clamping pad 48 extending therefrom which is positioned to overlie the conductor placed between the ears 36 to hold it securely in electrical and mechanical engagement therewith. The hinged tab 46 is folded over plate 32 positioned in the housing 44 and hole 51, in tab 46 is engaged about the stud 50 of housing 44 to hold the pad 48 in tight engagement about a conductor inserted between the ears 36.

After a connector plate 32 and housing 44 are assembled about a conductor 24, a similar connector plate and housing are assembled about a second conductor 26 and then the pair is joined together in face to face mating relationship as shown in FIG. 7. This is facilitated by a stud and slot on the back of tab 46 which mate with their counterparts when assembled together in face to face relationship as shown in FIG. 7, each housing 44 has a bail 52 and striker lug 54. Latch bail 52 snaps over and engages the corresponding striker lug 54 on the facing housing sub-assembly. As can be seen in FIG. 6 this secures the two sub-assemblies together to form the lamp receptacles 60 and 62 in the ends of the housing 44.

Figure 9:
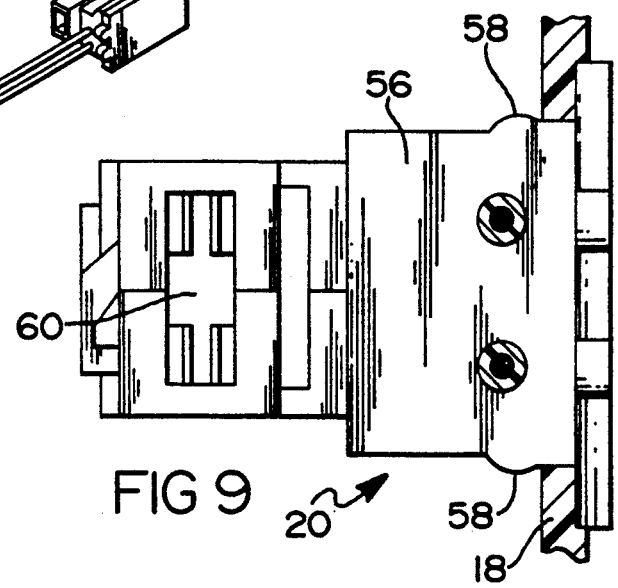
FIG. 9 is an end view of a bulb assembly taken on line 9—9 of FIG. 4.

The entire sub-assembly is then positioned in a mold for forming the resilient base 56 about the pair of housings 44 and the respective conductors 24 and 26 as they pass through the housings to form a unitary bulb sub-assembly 20 in which a pair of bulbs can be mounted one on each end of the housings at 60 and 62 and which are connected through the connector plates 32 to the appropriate conductor 24 or 26. Base 56 as may be seen in FIGS. 8 and 9, is completely molded about the housing sub-assembly and the conductors positioned therein to form a resilient compressible base which is adapted to be pushed in a cooperating opening in the back member 18 of a modular lamp assembly. As may be seen in FIGS. 8 and 9 a pair of ribs 58 are provided at the top and bottom of the base 56 so that once it is pushed into the opening in back member 18 it will be retained therein.

The base 56 can be made of any elastomeric polymer or other resilient material suitable for providing a shock mounting for the bulb assembly while allowing for the frictional insertion within a properly sized opening in the base 18 so as to permit easy installation and removal for servicing. The molded resin material also securely holds the two housings together at the lower part while the bail 52 and lug 54 hold the housings 44 in tight face to face engagement at the top for insertion of the bulb therein. As may be seen in FIGS. 7, 8, and 9, each half of the sub-assembly forms a connection between one of the conductors and one contact of a bulb when inserted in receptacle 60 or 62. The bulb filament is thus connected between the hot conductor and the ground conductor.

It is thus seen that a very simple modular arrangement has been developed in which a pair of bulbs can be quickly and easily inserted in the bulb assembly module which in turn can be simply and easily snapped into the base of the lamp assembly and the lens covers then simply snapped over a retainer ring formed in the base on the exterior side of the base to form a multiple modular lamp assembly for clearance lamp applications or similar types of uses.

While the preferred embodiment has been described as clearance lights for large vehicles, obviously this modular construction could be used for both single lights and multiple ganged lights for any type of illuminating application.

While this invention has been explained with reference to the structure disclosed herein, it is not confined to the details as set forth and this application is intended to cover any modifications and changes as may come within the scope of the following claims.

What is claimed is:

1. A bulb lamp assembly of the type adapted to be fixed on a pair of conductors and releasably snapped into a housing which comprises:

a first conductive connector plate having at least one bulb receptacle member and at least one conductor receptacle member arranged at opposite ends thereof;

a non conductive housing for said plate adapted to hold and insulate said plate, said housing having a hinged clamping tab and a locking stud adapted to capture a conductor within said conductor receptacle when said tab and stud are engaged to secure said conductor mechanically and electrically in said conductor receptacle, said non-conductive housing having an alignment stud and a latch bail and striker adapted to mate with a corresponding latch bail and striker of another identical housing when a pair of said housings are engaged in face to face mating relationship so that a pair of plates are connected to a pair of conductors to form at least one receptacle for a lamp.

2. The device of claim 1 wherein a pair of said housings are assembled together about a pair of conductors and resilient molded base is formed about the clamping tab and locking stud portion of said housing to form a resilient mounting for positioning a bulb sub-assembly in a reflector type lamp housing.

3. A bulb sub-assembly for a vehicle clearance lamp assembly of the type having an inner electrically conductive portion and an outer insulating housing portion which comprises;

first and second conductive connector plate members, first and second non-conductive housing members for receiving said plate members therein;

said first and second plate members having at least one pair of insulation piercing ears and at least one pair of bulb receiving spring fingers disposed at opposite ends of said plates;

a conductor operatively mounted in each plate in said insulation piercing ears;

said first and second plates being positioned in said first and second housings; said housings being juxtaposed in opposed mating relationships to form a pair of bulb receptacles at one end;

latching means for holding said first and second housing members together adjacent said bulb receptacles and, a resilient base member molded about said juxtaposed first and second housings and the conductors mounted therein; at the conductor ends thereof so as to form a bulb sub-assembly module for connecting a pair of bulbs to a pair of electrical conductors adapted to be connected to the vehicle electrical system.

4. A connector for connecting at least one bulb contact to a conductor, said connector comprising:

a generally rectangular base portion;

at least one pair of upstanding contact ears formed at one end of said base portion;

said ears being spaced apart a distance less than the diameter of a wire to be mounted therebetween;

at least one pair of spring fingers formed at the other end of said base portion adapted to receive therebetween the base contact portion of a bulb;

a non-conductive housing comprising a channel portion adapted to receive therein the spring fingers of said base portion;

a conductor clamping portion adapted to cooperate with said base portion contact ears to secure a conductor therein; and a latching mechanism having a bail and a striker lug adapted to engage a corresponding striker lug and bail respectively, of a second housing when juxtaposed in facing and mating relationship therewith.

5. A device as described in claim 4 wherein said pair of ears and pair of spring fingers are disposed to hold a conductor and a bulb in generally parallel but spaced apart relation.

6. A vehicle lamp assembly comprising;

a housing having a back member; at least one bulb sub-assembly and lens cover receiving means in said back member; at least one lens cover member adapted to be snapped into locking engagement with said back member; a bulb sub-assembly positioned in said receiving means in said back member; and a plurality of mounting means for affixing said lamp assembly to a vehicle said bulb sub-assembly including:

a pair of conductive bulb and conductor engaging connector plates;

a pair of non-conductive housings having mounted therein said connector plates;

latching means for securing said housings in mating face to face relationship;

an electrical conductor means positioned in the conductor engaging portion of said connector plates;

a resilient base member molded about said conductor means and the conductor engaging portion of said connector plates and housings to form a partially encapsulated bulb sub-assembly capable of being releasably positioned in the receiving means in said back member;

said sub-assembly forming with said connector plates and housings in the bulb engaging portion, at least one receptacle for frictionally and electrically connecting a bulb positioned therein to said conductors; and terminal means for said conductors for connecting said lamp sub-assembly to the vehicle electrical power system.

7. A lamp assembly as described in claim 6 including said back member having a plurality of bulb sub-assembly receiving openings and lens cover receptacles; and a corresponding plurality of bulb sub-assemblies positioned in said receiving openings.

8. A lamp assembly as described in claim 7 wherein the electrical conductor means in said connector plates forms a common parallel bus for connection to the vehicle electrical power system.

9. A lamp assembly as described in claim 7 wherein three bulb sub-assemblies are connected in parallel on said back member.

10. A lamp assembly as described in claim 6 wherein said connector plates form a pair of bulb receptacles for receiving two bulbs within each lens cover.

11. A lamp assembly as described in claim 10 wherein said pair of bulbs is mounted longitudinally along said back member and said lens cover includes a pair of individual lenses respectively aligned with said pair of bulbs.

12. A device as described in claim 8 wherein said terminal means includes a grounding lug secured to the conductor bus to engage one of said mounting means.

13. A device as described in claim 12 wherein a portion of said electrical conductor means extends outwardly of said lamp assembly for connection to the vehicle electrical system.

14. A connector for electrically connecting a pair of electrical bulbs to a pair of insulated electrical wires, said connector comprising:

a base portion;

two pairs of contact ears formed at one end of said base portion, said ears being spaced apart a distance less than the diameters of said electrical wires to be mounted therein;

two pair of spring fingers formed at the other end of said base portion for receiving therein electrical contact portions of a pair of electrical bulbs; and means for clamping said electrical wires between said two pairs of contact ears.

* * * * *

UNITED STATES PATENT AND TRADEMARK OFFICE
CERTIFICATE OF CORRECTION

PATENT NO. : 5,025,350
DATED : June 18, 1991
INVENTOR(S) : Alfred G. Tienken

It is certified that error appears in the above-identified patent and that said Letters Patent is hereby corrected as shown below:

Column 2, line 36, "cover" should read -- covers --

Column 6, line 18, Claim 6, delete "conductors" and insert thereat -- conductor means --

Signed and Sealed this

Second Day of March, 1993

Attest:

STEPHEN G. KUNIN

*Attesting Officer*    Acting Commissioner of Patents and Trademarks